(12) United States Patent
Aydt et al.

(10) Patent No.: US 7,815,022 B2
(45) Date of Patent: Oct. 19, 2010

(54) BRAKE CALIPER FOR A DISK BRAKE OF A MOTOR VEHICLE

(75) Inventors: Günter Aydt, Backnang (DE); Thomas Kirschner, Stuttgart (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 557 days.

(21) Appl. No.: 11/879,705

(22) Filed: Jul. 18, 2007

(65) Prior Publication Data

US 2008/0017458 A1    Jan. 24, 2008

(30) Foreign Application Priority Data

Jul. 18, 2006    (DE)    ................ 10 2006 033 159

(51) Int. Cl.
*F16D 65/00*    (2006.01)
(52) U.S. Cl. .................................. 188/73.1; 188/71.1
(58) Field of Classification Search ... 188/73.37–73.43, 188/71.1, 72.4, 73.1, 73.31, 205 R
See application file for complete search history.

(56) References Cited

U.S. PATENT DOCUMENTS

| | | | | |
|---|---|---|---|---|
| 3,580,361 A | * | 5/1971 | Eggstein et al. ............ | 188/72.4 |
| 4,047,598 A | * | 9/1977 | Thrower .................. | 188/205 R |
| 4,311,216 A | * | 1/1982 | Garrett et al. ............ | 188/73.43 |
| 5,875,873 A | * | 3/1999 | Kay et al. ................ | 188/73.37 |
| 6,302,243 B1 | | 10/2001 | Ruiz | |
| 6,910,555 B2 | | 6/2005 | Ciotti et al. | |
| 7,201,258 B2 | | 4/2007 | Schog et al. | |
| 2005/0056496 A1 | | 3/2005 | Reeves | |
| 2005/0077124 A1 | | 4/2005 | Reeves | |
| 2006/0219490 A1 | | 10/2006 | Eisengraber et al. | |

FOREIGN PATENT DOCUMENTS

| | | |
|---|---|---|
| DE | 42 08 132 A1 | 9/1992 |
| DE | 199 11 192 A1 | 9/2000 |
| DE | 103 06 137 A1 | 9/2004 |
| EP | 1167804 A1 | 1/2002 |
| WO | WO 01/31222 A1 | 5/2001 |
| WO | WO 03071152 A1 | 8/2003 |
| WO | WO 2004083668 A1 | 9/2004 |

\* cited by examiner

*Primary Examiner*—Melanie Torres Williams
(74) *Attorney, Agent, or Firm*—Laurence A. Greenberg

(57) ABSTRACT

In order to avoid oscillations and brake screeching associated with such oscillations, a brake caliper is provided with a reinforcing element. The reinforcing element is formed with a C-shaped profile element that is connected to the brake caliper on the underside of the housing of said brake caliper. The reinforcing element can also be configured in order to hold the brake pads and linings and therefore relieve the housing of the braking torque.

13 Claims, 7 Drawing Sheets

BRAKE CALIPER FOR A DISK BRAKE OF A MOTOR VEHICLE

CROSS-REFERENCE TO RELATED APPLICATION

This application claims the priority, under 35 U.S.C. §119, of German application DE 10 2006 033 159, filed Jul. 18, 2006; the prior application is herewith incorporated by reference in its entirety.

BACKGROUND OF THE INVENTION

Field of the Invention

The invention lies in the field of automotive technology. More specifically, the invention relates to a brake caliper for a disk brake of a motor vehicle. The brake caliper has a housing which comprises brake caliper limbs which are spaced apart from each other and lie opposite one another and at least one brake caliper bridge which connects the two brake caliper limbs to one another. The brake caliper limbs and the brake caliper bridge form an exposed edge as an integrated supporting frame which extends in a closed manner all around and has longitudinal and transverse edges, and recesses for hydraulic pistons for loading brake linings which are guided on bearing pins disposed in the housing of the brake caliper.

German published patent application DE 199 11 192 A1 describes a brake caliper for a disk brake, which is provided on its underside with a closed frame which follows all around the contour of the brake caliper. This frame is connected fixedly to the housing of the brake caliper, as a result of which the rigidity of the brake caliper is increased.

It has been shown, in the case of an increase in the diameter of the brake disk for a disk brake with identical installation space conditions of the brake caliper in the vehicle and in the case of a brake disk of smaller diameter, that the thickness of a brake caliper bridge has to be reduced. This measure necessitates overall a reduction in the rigidity of the brake caliper housing and considerable oscillation problems are therefore produced in the form of inherent oscillations and resultant noise problems, such as brake screeching.

SUMMARY OF THE INVENTION

It is therefore an object of the invention to provide a brake caliper for a brake disk of a disk brake in a motor vehicle, which brake caliper firstly compensates for a loss of rigidity of the brake caliper and secondly dissipates complexly occurring inherent oscillatory forms of the brake caliper and prevents brake screeching.

With the foregoing and other objects in view there is provided, in accordance with the invention, a brake caliper for a disk brake of a motor vehicle. The novel brake caliper comprises:

a housing formed with mutually spaced-apart, oppositely disposed brake caliper limbs and at least one brake caliper bridge connecting said brake caliper limbs to one another;

said brake caliper limbs and said brake caliper bridge forming an exposed edge defining an integrated supporting frame extending in a closed manner all around and having longitudinal and transverse edges;

said housing of the brake caliper being formed with recesses for hydraulic pistons for loading brake linings;

fastening elements connecting said housing of the brake caliper via said supporting frame to a reinforcing element formed of a profile element that is open at at least one of said brake caliper limbs of said housing.

The advantages which are achieved mainly with the invention consist in that, as a result of a connection of the brake caliper to a reinforcing element, the problems which are produced of inherent oscillatory forms of the brake caliper as a result of the increase in the disk diameter of the brake disk and an associated reduction in the bridge thickness of the brake caliper are to be suppressed effectively. This is achieved, in particular, by the housing of the brake caliper being connected on the supporting frame via fastening elements to a reinforcing element which comprises an open profile element which is arranged at least in the region of a brake caliper limb of the housing of the brake caliper. The reinforcing element comprises a single-piece C-profile element, having a longitudinal web and attached transverse webs, and in each case adjoining projections on the transverse webs, and the longitudinal web is oriented toward the vehicle wheel. The use of a reinforcing element of this type for the brake caliper results in an optimum rigidity of the housing during driving operation, with the result that the inherent oscillatory forms of the brake caliper which occur in the form of torsional oscillations, flexural oscillations and shearing and thrust oscillations, and a combination of these oscillatory forms, are suppressed as far as possible. This also avoids the (low frequency) noise problems which are produced from these oscillations, such as brake screeching.

In particular, the reinforcing element according to the invention is attached to a longitudinal web on the outer wheel-side brake caliper half, as pronounced oscillation amplitudes are produced in this region of the brake caliper.

Furthermore, there is provision according to the invention for the reinforcing element to be arranged with its longitudinal web spaced apart from the longitudinal edge of the brake caliper and to have receptacles for fastening the brake caliper to the wheel carrier or a component of this kind. The reinforcing element is connected to the supporting frame on the housing of the brake caliper, firstly via the longitudinal web and secondly via the projection of the transverse web, by means of the fastening elements. The longitudinal web of the reinforcing element has, in each case on the end side, first fastening elements which comprise screws which are held in a bridge section. In each case the second fastening elements are arranged in the projections of the transverse webs, which second fastening elements lie opposite the first fastening elements and comprise screws or the like which are held in a bridge section of the brake caliper. This embodiment of the brake caliper and the reinforcing element and their fastening to the brake caliper housing achieves a situation where, as a result of the fixed screwing to the reinforcing element, in particular as a result of at least quadruple screwing, stiffening of the brake caliper housing is achieved to such an extent that the occurrence of the complex inherent oscillatory forms is suppressed and, as a consequence, brake screeching is suppressed as far as possible. As a result of the attachment of the reinforcing element directly to the brake caliper housing, it is additionally achieved according to the invention that the rigidity is optimized or improved; this is because a reduced brake caliper deflection at high compressive loads also results here in a reduction in the volumetric consumption of brake fluid.

In order to increase the stability in the bridge region between the fastening means of the reinforcing element to the housing of the brake caliper, the brake caliper according to the invention firstly has two central bridge sections which connect the brake caliper limbs to one another and have a free space or a recess between them, weight-saving cutouts being arranged at least in edge regions of the housing, in each case directly adjacently to the bridge sections. In each case one recess is arranged between the central bridge sections and the further end-side bridge sections of the brake caliper housing, and the end-side bridge section is connected directly to the reinforcing element via the fastening elements, via the exposed edge of the housing of the brake caliper. As a result, the invention advantageously achieves a situation where, despite the small thickness of the bridge sections, the required brake caliper rigidity is maintained, which is achieved, in particular, by the two central bridge sections. In order for additional weight also to be saved in the brake caliper, the edge regions of the brake caliper have a plurality of cutouts.

According to a further embodiment of the invention, there is provision for the projections of the reinforcing element to have arms which are angled away at the free end and have bearing pins for a first brake lining on the end side, opposite which bearing pins further bearing pins for the second brake lining lie on the longitudinal web of the reinforcing element. Protruding brackets or arms which receive the bearing pins for the second brake lining are arranged on the longitudinal web of the reinforcing element. As a result, the invention advantageously achieves a situation where circumferential forces of the brake linings are introduced directly into the reinforcing element. Substantially only tensile stress forces have to be transmitted by the brake caliper itself, advantages also being achieved with regard to the oscillation behavior. In addition, the mounting of the brake linings on the reinforcing element results in a decoupling of said brake linings from the brake caliper, which can be of advantage for the avoidance of oscillations.

Other features which are considered as characteristic for the invention are set forth in the appended claims.

Although the invention is illustrated and described herein as embodied in brake caliper for a disk brake of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

DETAILED DESCRIPTION OF THE INVENTION

Figure 1:
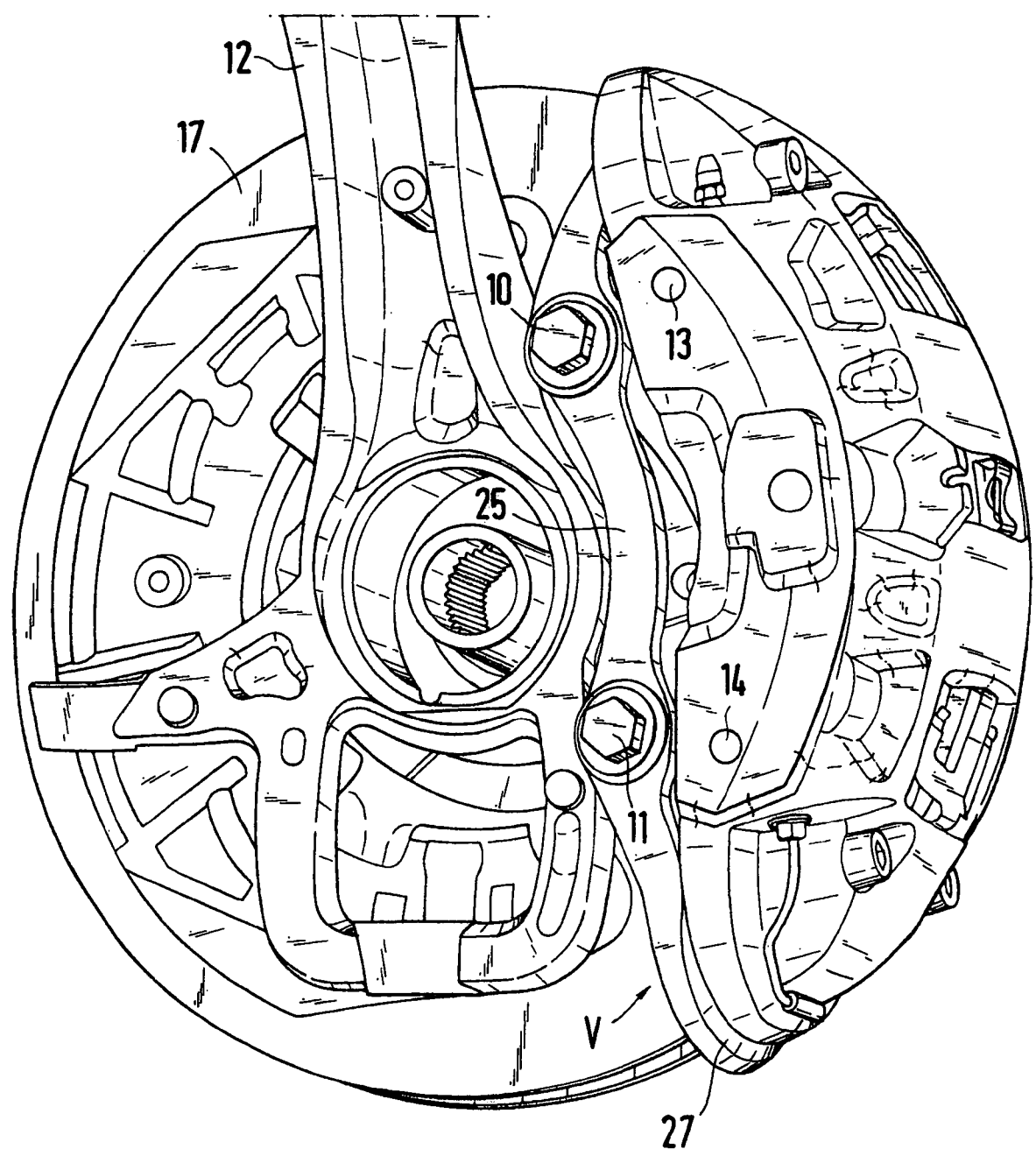
FIG. 1 is a perspective view of a brake with attachment of a brake caliper via a reinforcing element to the wheel carrier, as viewed from the inside in the wheel well.

Referring now to the figures of the drawing in detail the brake caliper 1 according to the invention comprises a housing having two brake caliper limbs 2 and 3 which are arranged opposite and spaced apart from one another. Said brake caliper limbs 2, 3 are connected to one another via brake caliper bridges 5, 5a or 6, 7. They extend approximately semicircularly transversely over the brake caliper 1 and form, at the edge with the free edges of the brake caliper limbs 2, 3, what is known as an integrated supporting frame which is configured so as to extend all round and be closed. This supporting frame 8 which is integrated into the brake caliper 1 forms longitudinal edges L1, L2 and transverse edges Q1 and Q2. The reinforcing element V; V1 which carries the brake caliper 1 and is connected to a wheel carrier 12 or a component of this type of a vehicle is connected to the supporting frame 8.

The brake caliper 1 is connected via screws which are disposed in receptacles 10, 11 and are connected fixedly to the wheel carrier 12 or the like on the vehicle, as FIG. 1 shows in greater detail. Brake linings 15, 15a are held displaceably with respect to a brake disk on the brake caliper 1 via bearing pins 13, 14; 13a, 14a. The brake linings 15, 15a are loaded via hydraulic pistons which are arranged such that they are guided in the housing of the brake caliper 1.

Figure 2:
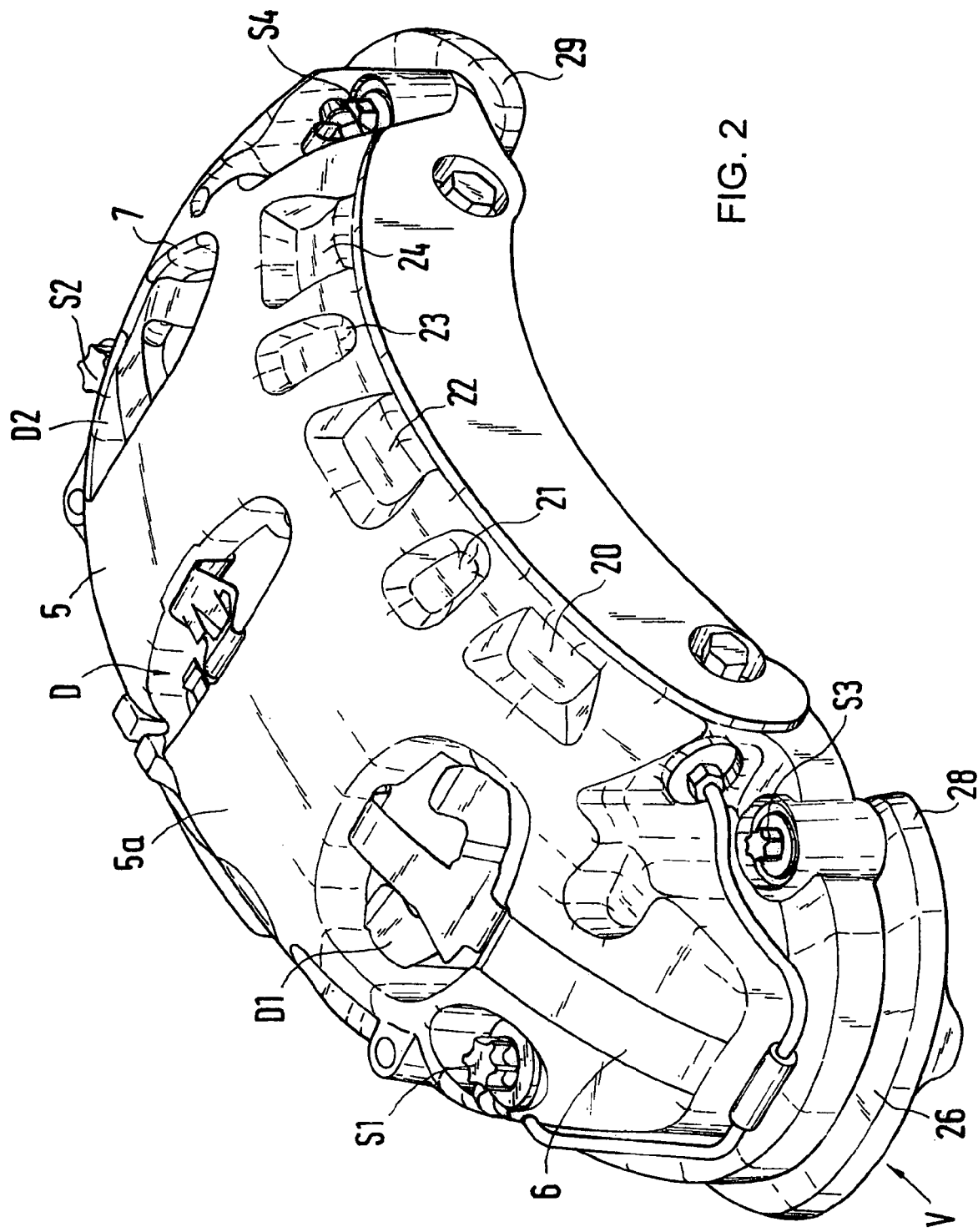
FIG. 2 is a perspective view of the brake caliper with the reinforcing element.

FIG. 2 shows the brake caliper bridges 5, 5a and 6, 7 in greater detail, a first recess D or aperture being arranged between the brake caliper bridges 5 and 5a. In each case one further aperture D1 and D2 which is adjoined in each case by a brake caliper bridge 6 or 7 which ends in the supporting frame 8 is provided next to the brake caliper bridges 5 and 5a. In each case formed recesses 20 to 24 are provided on the end side of the brake caliper bridges 5, 5a and 6, 7, these formed recesses having a weight-saving effect and the formed recesses 20, 22, 24 in the region of the apertures D1, D and D2 having a greater volume than the formed recesses 21 and 23 in the region of the brake caliper bridges 5 and 5a.

Figure 3:
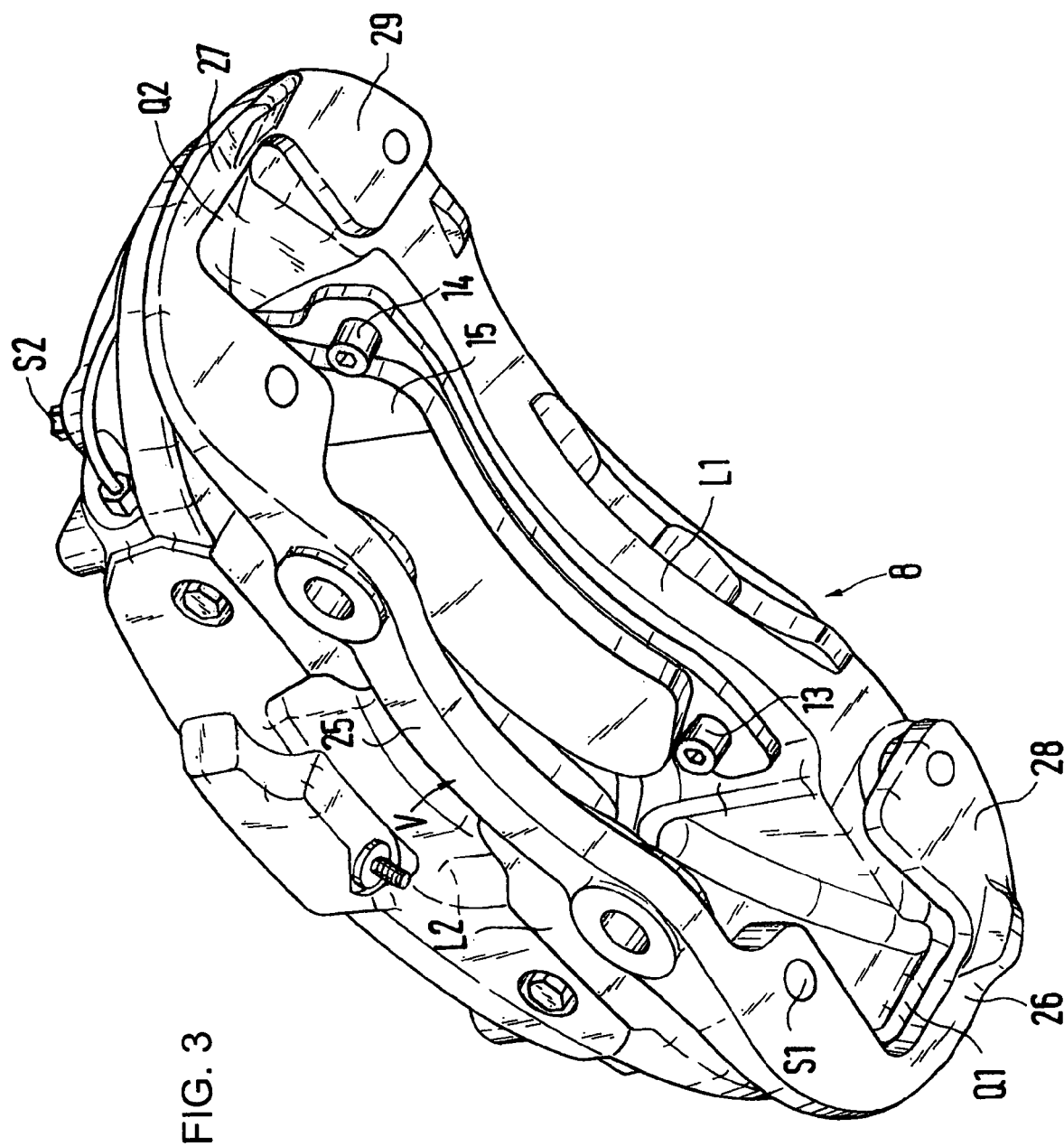
FIG. 3 is a bottom perspective view of the brake caliper with the reinforcing element.
Figure 4:
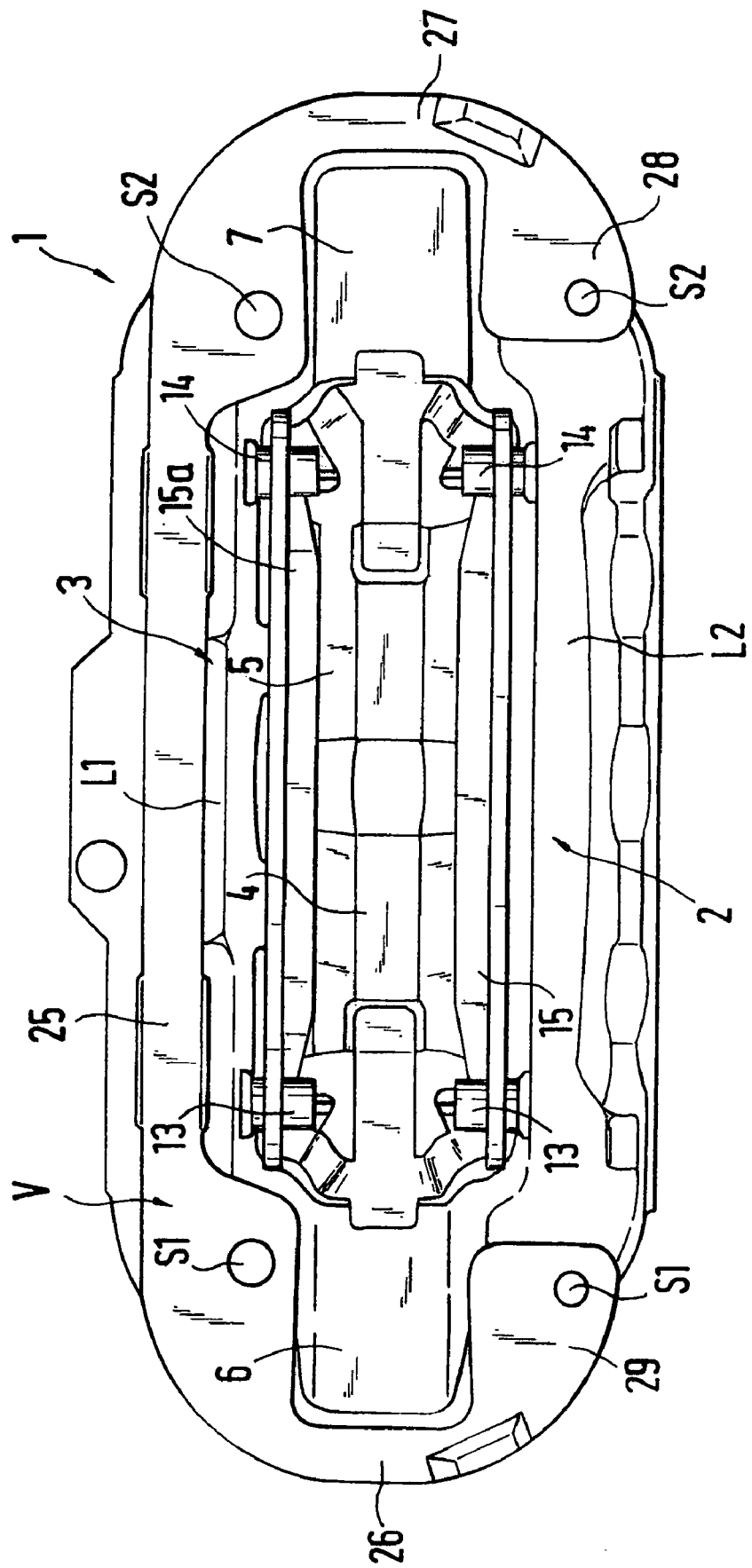
FIG. 4 is a bottom view of the brake caliper with the reinforcing element.
Figure 5:
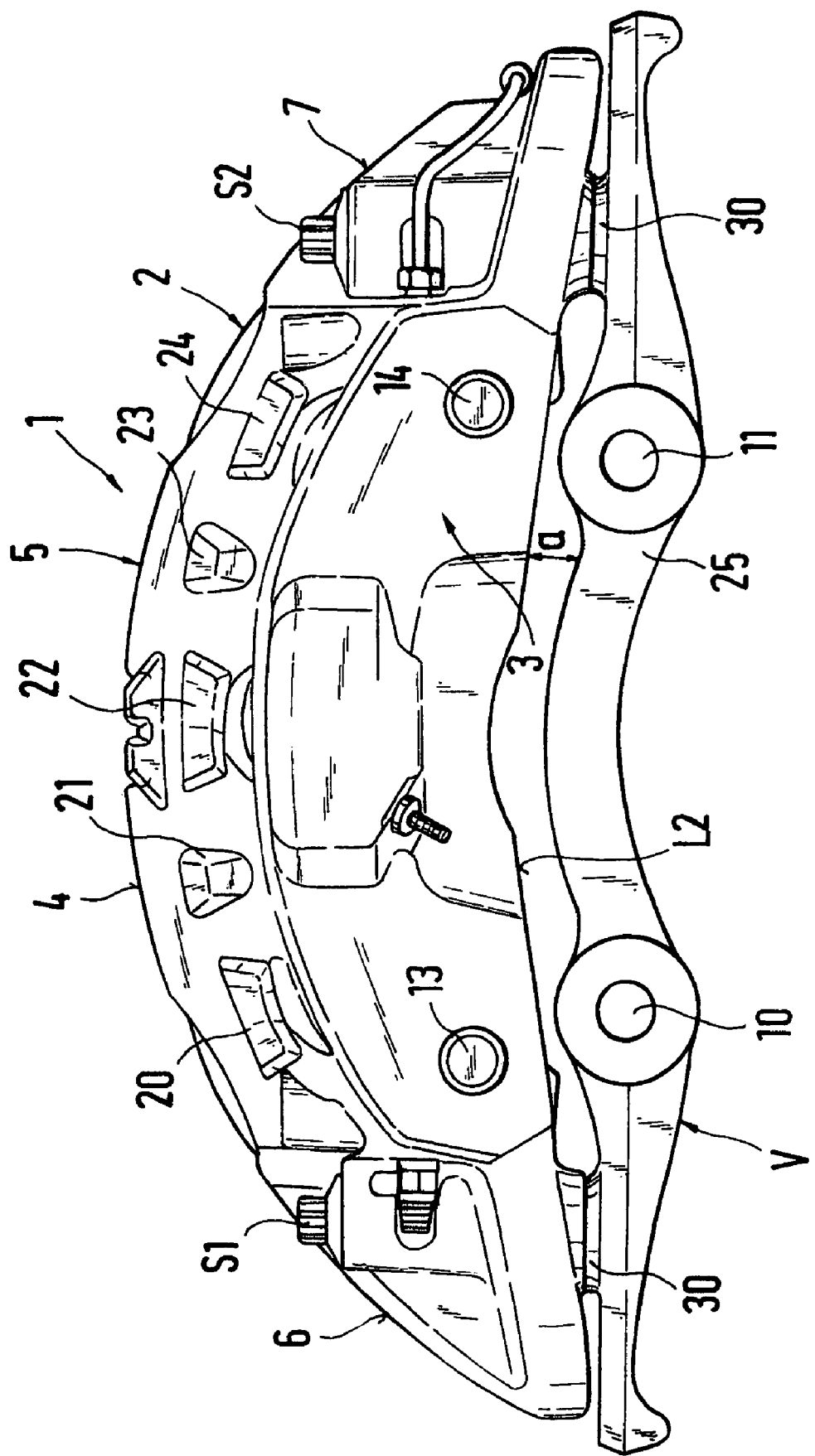
FIG. 5 is a side view of the brake caliper with the reinforcing element.

The reinforcing element V; V1 comprises a C-shaped profile element which is of single-piece configuration and has a longitudinal web 25 and, on the end side, in each case one transverse web 26 and 27 and projections 28, 29 which adjoin the latter and extend approximately parallel to the longitudinal web 25 of the reinforcing element V; V1, as shown in greater detail in FIGS. 3 and 4.

The reinforcing element V; V1 is oriented with its longitudinal web 25 toward a pivoting bearing or wheel carrier 12 (FIG. 1) and is firstly connected via screw elements S1 and S2 to the integrated supporting frame 8 which is formed by the housing of the brake caliper 1, and secondly the projections 28, 29 of the reinforcing element V; V1 are connected to the supporting frame 8 via screw elements S3 and S4. The screw elements are shown only symbolically.

The longitudinal web 25 of the reinforcing element V; V1 extends below a longitudinal edge L2 of one brake caliper limb 3 of the housing of the brake caliper 1, and is arranged spaced apart at a spacing a from the latter. The reinforcing element V; V1 can bear directly against the supporting frame 8 of the brake caliper 1 via what are known as extensions or protruding molded projections 30 which bear directly against the supporting frame 8. The transverse webs 26 and 27 and the projections 28 and 29 are likewise arranged in the contour below the transverse edges Q1 and Q2 and the longitudinal edge L1.

Figure 6:
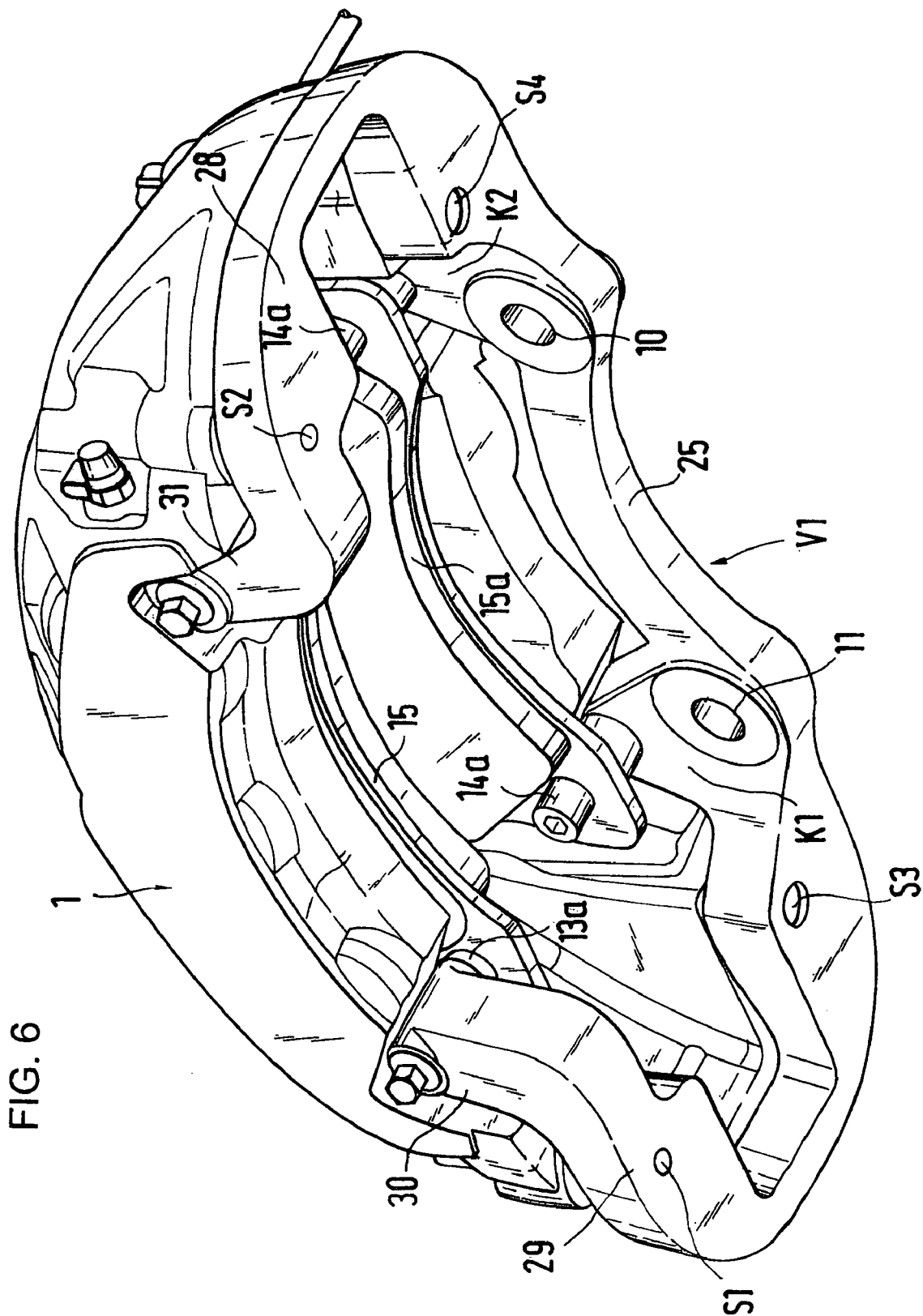
FIG. 6 is a bottom, side perspective view showing a further embodiment of the reinforcing element with mountings for brake linings.
Figure 7:
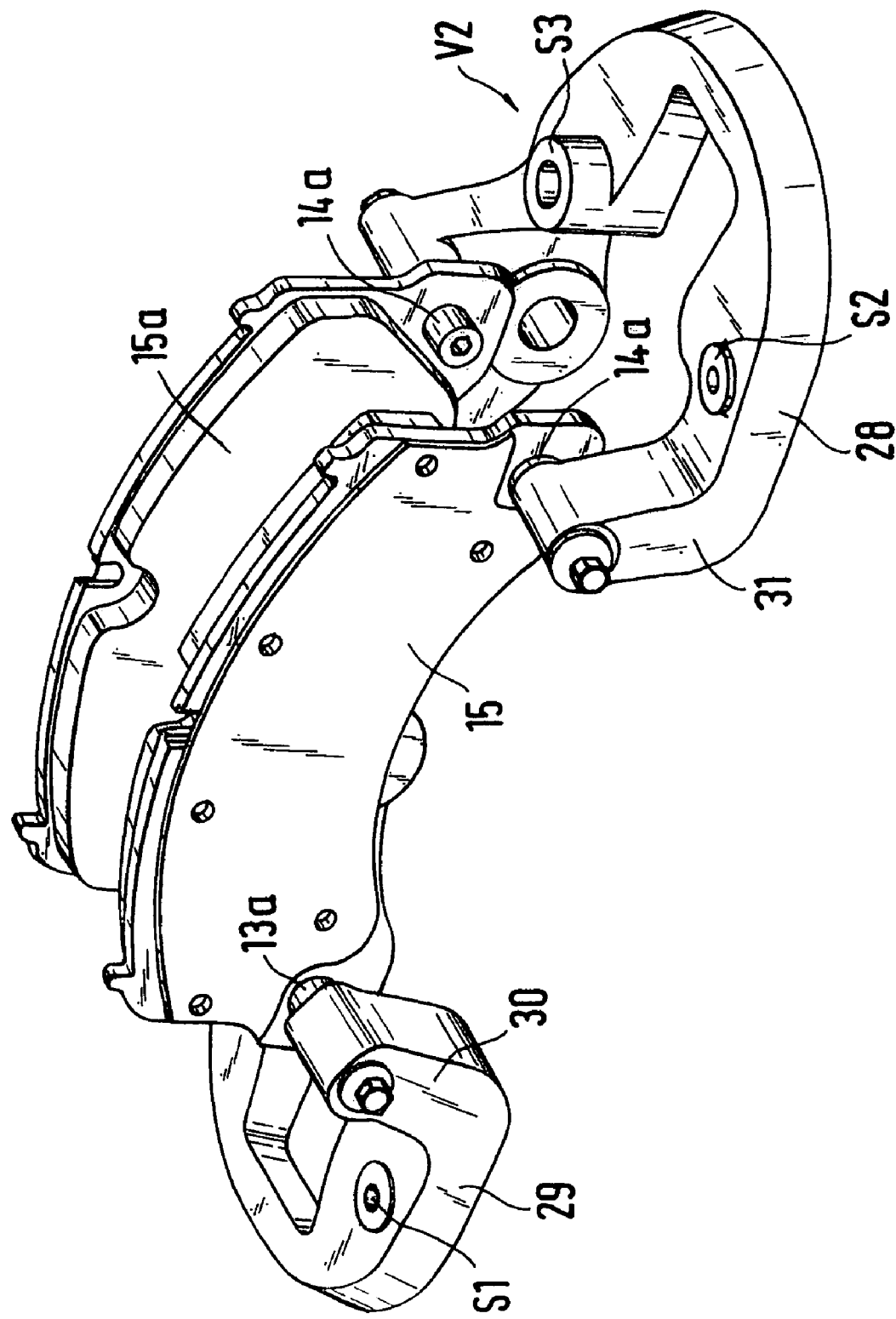
FIG. 7 is a top, side perspective view showing the reinforcing element with mounted brake linings.

According to a further embodiment according to FIGS. 6 and 7 of the invention, the reinforcing element V1 is configured and arranged in accordance with the described embodiment. In addition, the reinforcing element V1 has arms 30, 31 which are angled away at the free ends of the projections 28, 29. Bearing pins 13a for the brake lining 15 are held in these arms 30, 31.

Protruding brackets or arms K1 and K2 which have bearing pins 14a for the second brake lining 15a are arranged on the longitudinal web 25 of the reinforcing element V1. All bearing pins 13a, 14a are of identical configuration.

In this second embodiment according to FIGS. 6 and 7, the circumferential forces of the brake linings 15 and 15a are introduced directly into the reinforcing element V1. Here, substantially only the brake application forces have to be transmitted by the brake caliper 1 itself. The reinforcing element V and V1 comprises a high strength steel. The at least quadruple screwing of the reinforcing element V and V1 to the brake caliper housing 1 stiffens it in such a way that the occurrence of complex inherent oscillatory forms is suppressed and brake screeching is suppressed as far as possible.

The invention claimed is:

1. A brake caliper for a disk brake of a motor vehicle, comprising:
    a housing formed with mutually spaced-apart, oppositely disposed brake caliper limbs and at least one brake caliper bridge connecting said brake caliper limbs to one another;
    said brake caliper limbs and said brake caliper bridge forming an exposed edge defining an integrated supporting frame extending in a closed manner all around and having longitudinal and transverse edges;
    said housing of the brake caliper being formed with recesses for hydraulic pistons for loading brake linings;
    fastening elements connecting said housing of the brake caliper via said supporting frame to a reinforcing element formed of a profile element that is open at at least one of said brake caliper limbs of said housing;
    wherein said reinforcing element comprises a single-piece C-profile element, having a longitudinal web and attached transverse webs, and in each case adjoining projections on said transverse webs, and wherein said longitudinal web is directly connected to a wheel carrier or pivoting bearing oriented toward a vehicle wheel together with the brake caliper.

2. The brake caliper according to claim 1, wherein said longitudinal web of said reinforcing element extends below a longitudinal edge of a first limb of said supporting frame, within a contour of said longitudinal edge, and said two transverse webs are disposed below said transverse edge, and said projections of said transverse webs are disposed under a part region of a further longitudinal edge of a second limb of said supporting frame.

3. The brake caliper according to claim 1, wherein said reinforcing element is disposed with a longitudinal web thereof spaced apart from a longitudinal edge of one of said brake caliper limbs and includes receptacles for fastening the brake caliper to a wheel carrier.

4. The brake caliper according to claim 1, wherein said reinforcing element is connected to said supporting frame on said housing of the brake caliper, via a longitudinal web thereof and via a projection of said transverse webs, by way of said fastening elements.

5. The brake caliper according to claim 1, wherein said reinforcing element is formed with a longitudinal web having ends each connected with a first fastening element formed of a bolt held in a bridge section of the brake caliper.

6. The brake caliper according to claim 5, wherein second fastening elements are respectively disposed in projections of transverse webs connected to said longitudinal web, said second fastening elements lying opposite said first fastening elements and comprising bolts held in said bridge section of the brake caliper.

7. The brake caliper according to claim 6, wherein said projections of said transverse webs and said longitudinal web of said reinforcing element are supported on said integrated supporting frame of the brake caliper via protruding extensions.

8. The brake caliper according to claim 1, wherein said housing of the brake caliper is an aluminum casting and said reinforcing element is formed of high strength steel.

9. The brake caliper according to claim 1, wherein two central bridge sections connecting said brake caliper limbs to one another and defining a recess therebetween are disposed on said housing of the brake caliper between said fastening elements of said reinforcing element.

10. The brake caliper according to claim 1, wherein said projections of said reinforcing element have arms with angled-away free ends and first bearing pins for a first brake lining on an end side, and wherein further bearing pins opposite said first bearing pins for a second brake lining are disposed on said longitudinal web of said reinforcing element.

11. The brake caliper according to claim 10, wherein two protruding brackets or arms configured to receive said bearing pins for the second brake lining are disposed on said longitudinal web of said reinforcing element.

12. A brake caliper for a disk brake of a motor vehicle, comprising:
    a housing formed with mutually spaced-apart, oppositely disposed brake caliper limbs and at least one brake caliper bridge connecting said brake caliper limbs to one another;
    said brake caliper limbs and said brake caliper bridge forming an exposed edge defining an integrated supporting frame extending in a closed manner all around and having longitudinal and transverse edges;
    said housing of the brake caliper being formed with recesses for hydraulic pistons for loading brake linings;
    fastening elements connecting said housing of the brake caliper via said supporting frame to a reinforcing element formed of a profile element that is open at at least one of said brake caliper limbs of said housing;
    wherein two central bridge sections connecting said brake caliper limbs to one another and defining a recess therebetween are disposed on said housing of the brake caliper between said fastening elements of said reinforcing element; and
    wherein said housing is formed with differently-sized weight-saving cutouts at least in edge regions of said housing, in each case adjoining said bridge sections and recesses.

13. The brake caliper according to claim 12, wherein in each case said recesses are formed between said central bridge sections and further end-side bridge sections of said housing, said end-side bridge sections being connected directly to said reinforcing element by way of fastening elements via said exposed edge of said housing.

* * * * *